(12) United States Patent
Alameldeen et al.

(10) Patent No.: US 9,223,710 B2
(45) Date of Patent: Dec. 29, 2015

(54) READ-WRITE PARTITIONING OF CACHE MEMORY

(71) Applicant: Intel Corporation, Santa Clara, CA (US)

(72) Inventors: Alaa R. Alameldeen, Aloha, OR (US); Christopher B. Wilkerson, Portland, OR (US); Samira M. Khan, San Antonio, TX (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 13/844,823

(22) Filed: Mar. 16, 2013

(65) Prior Publication Data

US 2014/0281248 A1   Sep. 18, 2014

(51) Int. Cl.
  *G06F 12/00*   (2006.01)
  *G06F 12/08*   (2006.01)
  *G06F 12/12*   (2006.01)

(52) U.S. Cl.
  CPC ........ *G06F 12/0864* (2013.01); *G06F 12/0804* (2013.01); *G06F 12/0862* (2013.01); *G06F 12/127* (2013.01); *G06F 2212/604* (2013.01)

(58) Field of Classification Search
  None
  See application file for complete search history.

(56) References Cited

U.S. PATENT DOCUMENTS

| | | | |
|---|---|---|---|
| 4,430,712 A | 2/1984 | Coulson et al. | |
| 4,503,501 A | 3/1985 | Coulson et al. | |
| 5,434,992 A | 7/1995 | Mattson | |
| 6,205,544 B1 | 3/2001 | Mills et al. | |
| 6,321,240 B1 | 11/2001 | Chilimbi et al. | |
| 6,330,556 B1 | 12/2001 | Chilimbi et al. | |
| 6,393,525 B1 | 5/2002 | Wilkerson et al. | |
| 6,463,580 B1 | 10/2002 | Wilkerson | |
| 6,493,800 B1 | 12/2002 | Blumrich | |
| 6,535,961 B2 | 3/2003 | Wilkerson et al. | |
| 6,662,272 B2 | 12/2003 | Olarig et al. | |
| 6,662,273 B1 | 12/2003 | Wilkerson et al. | |
| 6,668,306 B2 | 12/2003 | Rakvic et al. | |
| 6,754,776 B2 | 6/2004 | Conway et al. | |
| 6,760,816 B1 | 7/2004 | Ju et al. | |
| 6,779,108 B2 | 8/2004 | Ju et al. | |
| 6,782,469 B1 | 8/2004 | Wilkerson et al. | |
| 6,785,797 B2 | 8/2004 | Wong et al. | |
| 6,862,606 B1 | 3/2005 | Major et al. | |
| 6,865,647 B2 | 3/2005 | Olarig et al. | |

(Continued)

*Primary Examiner* — Aimee Li
*Assistant Examiner* — Jason Blust
(74) *Attorney, Agent, or Firm* — Trop, Pruner & Hu, P.C.

(57) ABSTRACT

A system and method to enforce read-write partitioning in an N-way, set associative cache may limit a number of ways allocated for storing modified data in a set to a value W and limit a number of ways holding read data to a value R. The cache may be configured where N=R+W. Furthermore, a number of ways storing prefetched read data may be limited to $R_P$, while a number of ways storing prefetched modified data may be limited to $W_P$. The values for W, R, $W_P$, and/or $R_P$ may be determined using a prediction method to estimate cache miss rates for different values for W, R, $W_P$, and/or $R_P$ and selecting values corresponding to a desired cache miss rate, and so allowing for selective application of the read-write partitioning.

15 Claims, 8 Drawing Sheets

(56) References Cited

U.S. PATENT DOCUMENTS

| | | |
|---|---|---|
| 6,871,264 B2 | 3/2005 | Soltis, Jr. |
| 6,931,490 B2 | 8/2005 | Wong et al. |
| 6,954,848 B2 | 10/2005 | Rakvic et al. |
| 6,957,304 B2 | 10/2005 | Wilkerson |
| 7,058,764 B2 | 6/2006 | Bearden |
| 7,111,124 B2 | 9/2006 | Iyer et al. |
| 7,111,132 B2 | 9/2006 | Wilkerson |
| 7,114,059 B2 | 9/2006 | Wilkerson |
| 7,143,272 B2 | 11/2006 | Wilkerson et al. |
| 7,206,918 B2 | 4/2007 | Wong et al. |
| 7,480,838 B1 | 1/2009 | Wilkerson et al. |
| 7,536,692 B2 | 5/2009 | Lakshmanamurthy et al. |
| 7,558,919 B1 | 7/2009 | Yochai et al. |
| 7,622,961 B2 | 11/2009 | Grochowski et al. |
| 7,624,258 B2 | 11/2009 | Wilkerson et al. |
| 7,653,850 B2 | 1/2010 | Tschanz et al. |
| 7,996,644 B2 | 8/2011 | Kottapalli |
| 8,094,500 B2 | 1/2012 | Paley et al. |
| 8,095,736 B2 | 1/2012 | Rossi |
| 8,103,830 B2 | 1/2012 | Wilkerson et al. |
| 8,125,246 B2 | 2/2012 | Grochowski et al. |
| 8,245,111 B2 | 8/2012 | Chisti et al. |
| 8,296,522 B2 | 10/2012 | Harikumar et al. |
| 8,301,840 B2 | 10/2012 | Anand et al. |
| 2002/0087802 A1* | 7/2002 | Al-Dajani et al. ............ 711/137 |
| 2002/0174301 A1 | 11/2002 | Conway et al. |
| 2002/0184327 A1 | 12/2002 | Major et al. |
| 2003/0005219 A1 | 1/2003 | Royer, Jr. et al. |
| 2003/0065886 A1 | 4/2003 | Olarig et al. |
| 2003/0084250 A1* | 5/2003 | Gaither et al. ................ 711/133 |
| 2003/0172234 A1 | 9/2003 | Soltis, Jr. |
| 2004/0143707 A1 | 7/2004 | Olarig et al. |
| 2004/0205296 A1* | 10/2004 | Bearden ....................... 711/129 |
| 2005/0076179 A1 | 4/2005 | Schopp |
| 2005/0102486 A1 | 5/2005 | Lakshmanamurthy et al. |
| 2005/0278486 A1* | 12/2005 | Trika et al. ................... 711/142 |
| 2006/0143390 A1 | 6/2006 | Kottapalli |
| 2006/0195662 A1 | 8/2006 | Folio |
| 2009/0019229 A1* | 1/2009 | Morrow et al. ............... 711/137 |
| 2009/0164730 A1 | 6/2009 | Harikumar et al. |
| 2009/0216953 A1 | 8/2009 | Rossi |
| 2009/0313437 A1 | 12/2009 | Sofman et al. |
| 2010/0172180 A1 | 7/2010 | Paley et al. |
| 2011/0055827 A1 | 3/2011 | Lin et al. |
| 2011/0145505 A1 | 6/2011 | Anand et al. |
| 2012/0124294 A1* | 5/2012 | Atkisson et al. ............. 711/135 |
| 2012/0198172 A1 | 8/2012 | Lin et al. |
| 2012/0226872 A1* | 9/2012 | Rajic ............................ 711/137 |
| 2013/0073812 A1* | 3/2013 | Kanai et al. .................. 711/141 |

\* cited by examiner

READ-WRITE PARTITIONING OF CACHE MEMORY

TECHNICAL FIELD

Embodiments described herein generally relate to cache memories and, in particular, to multiple way, set-associative cache memories.

BACKGROUND

To avoid the latency associated with system memory accesses, cache memory may be used by a processor. The benefit derived from using a cache memory is a function of the percentage of memory access instructions that can be retrieved without accessing system memory directly.

DESCRIPTION OF EMBODIMENTS

Figure 1:
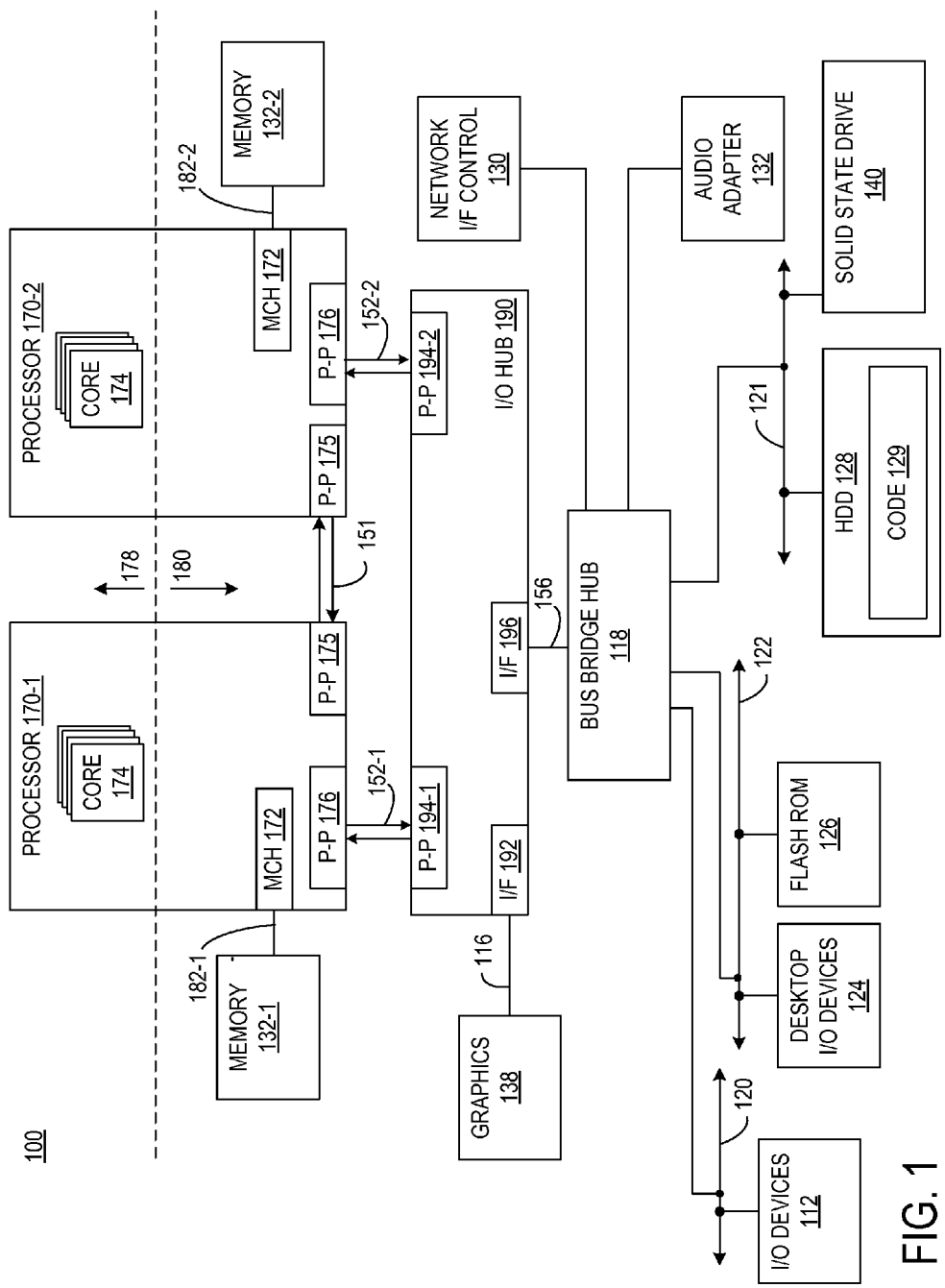
FIG. 1 illustrates a point-to-point computer system that may be used in conjunction with at least one embodiment.

Embodiments described herein pertain to a technique for partitioning cache memory into read/write partitions. Cache memory is used to reduce latency associated with memory access operations. Instructions and/or data may be cached when first used to enable faster subsequent access. In certain instances, prefetching of instructions and/or data may be performed to place needed memory locations in the cache memory in advance of their use by the processor. In certain instances, cache misses may lead to a complete stall of the execution unit while waiting for the requested data to be retrieved from system memory. Thus, a goal of caching memory locations is to increase the number of cache hits versus cache misses, thereby improving overall performance of the processor.

A significant feature of any methodology for selecting data for inclusion in a cache is the replacement policy that identifies data to be evicted when a cache that is full must allocate space for a memory address. Typically, cache replacement and/or prefetching algorithms do not differentiate between read requests and write requests. In at least one embodiment, a cache memory is partitioned into a portion that stores clean data, referred to herein as a read partition, and a second portion that stores modified data, referred to herein as a write partition. In at least one embodiment, a cache replacement algorithm favors clean entries over modified entries by expressly limiting the number of ways that can contain modified data.

In at least one embodiment, a processor disclosed herein includes a processing core, an N-way, set associative cache memory accessible to the processing core, and a cache memory controller. In at least one embodiment, the cache memory controller defines, determines, or otherwise recognizes partitions within each set of the cache memory and determines cache line replacement policies based, at least in part, on the partitions. In some embodiments, the cache controller may recognize a write partition that identifies which W ways within any set may contain modified data. When a write instruction misses in the cache, in at least one embodiment, write data indicated by the write instruction may be cached in any way of the applicable set that is included in the write partition. In other embodiments, a cache controller may implement an analogous policy for read data, also referred to herein as clean data, e.g., allocate an entry that is part of the read partition when a read instruction misses in the cache.

In some embodiments, the cache controller determines a first partition that represents M ways within each set of the cache memory. Embodiments of the cache memory controller allocate a way, from the first partition of a cache memory set associated with an instruction of a first type that misses in the cache, to store first data associated with the first instruction. If the instruction of the first type is a write instruction, in at least one embodiment, the first partition may be a write partition and the M ways defining the partition may be referred to herein as the W ways in reference to write instructions. If the cache controller subsequently detects a write instruction that misses in the cache, in at least one embodiment, write data associated with the write instruction is allocated to a way within a write partition of the cache line. Some embodiments implement partitioning by defining a maximum number of ways containing modified data, in the case of a write partition, or containing clean data, in the case of a read partition, rather than identifying specific ways or a specific group of ways that make up a partition.

Some embodiments extend the partitioning of ways to encompass a prefetch policy. In at least one embodiment, a cache controller may recognize a maximum number of ways in the applicable set that store prefetched write data or prefetched read data, or both.

In at least one embodiment, the cache memory includes a configuration register to store an indication of the value W, for a write partition, indicating a maximum number of ways per set that may contain modified data. The configuration register may further include a value R, for a read partition, indicating a maximum number of ways per set that may store clean data. In at least one embodiment, the cache controller is operable to monitor, calculate, or determine miss rates for different values of W and/or R and to select the value of W or R or both that produces the lowest miss rate.

In at least one embodiment that employs a write partition, the cache controller caches write data associated with a write instruction that misses in the cache by overwriting modified data when the write instruction hits to a set and way containing modified data. In at least one embodiment that employs a write partition, if the write instruction hits to an entry, i.e., a set and a way, containing clean data and the write partition is full, i.e., the number of ways storing modified data is not less than W, the controller will select, from the write partition, a victim way containing modified data, write back the modified data in the victim way, cache the write data associated with the write instruction in the victim way, and invalidate the way to which the write instruction hit since it contains data that is no longer current.

Some embodiments implement a method that includes obtaining a value W indicating a maximum number of ways containing modified data in an N-way, set associative data cache and detecting a write address of a write instruction that misses in the data cache. Embodiments of the method may then allocate, in compliance with a write policy recognizing W, a way from a set that is associated with the write address to cache write data included in the write instruction.

In at least one embodiment, the write policy provides that, when a write instruction hits to an entry at a set and way containing unmodified data and the write partition is full, i.e., the set includes at least W ways containing modified data, the write data is cached in the entry, thereby temporarily increasing the number of ways containing modified data above W, and a flag is set or information is otherwise recorded indicating that, when next allocating an entry to store clean data, the write policy should preferentially replace a way that contains modified data so that the number of modified data lines returns to the maximum value W.

In some embodiments, the write policy further includes, when the write instruction hits to an entry at a set and way containing unmodified data and the set includes at least W ways containing modified data, identifying, in the set, a first way containing modified data, writing back the modified data in the first way, caching the write data in the first way, and invalidating the entry that contained the clean data.

Some embodiments may detect a read address of a read instruction that misses in the data cache and allocate, in compliance with the write policy recognizing W, a way of a set associated with the read address to cache read data associated with the read instruction.

Embodiments may support a read partition policy that includes responding, when a read address associated with a read instruction misses in the data cache, by allocating, in compliance with a read policy recognizing a value R, a way in the set for caching read data associated with the read instruction, where the value R indicates a maximum number of ways per set containing unmodified data. Allocating the way, in these embodiments, includes determining from cache line status bits, including clean line status bits indicating clean lines, a number of ways in the set containing unmodified data. When the read partition is full because the number of ways containing clean data in the set is not less than the value R, in at least one embodiment, a victim way may be selected from the ways containing unmodified data and the read data may be cached in the victim way.

In at least one embodiment, a disclosed method determines a value W indicating a maximum number of ways available to store modified data in an N-way set associative data cache. The method may include detecting modified data and a write address associated with a write instruction, such as a store instruction. When caching the modified data in a set associated with the write address, a write policy that restricts a number of ways storing modified data in the set to the maximum number W may be enforced in at least one embodiment. In some embodiments, W may include calculating cache miss rates for different values of W, and determining W based on the cache miss rates.

In some embodiments, the method includes detecting a read address associated with a read instruction, such as a load instruction. When accessing a set associated with the read address to retrieve read data from the set, a read policy that restricts a number of ways storing read data in the set to a maximum number R may be enforced in at least one embodiment.

In some embodiments, when a write instruction hits to a set and way storing a modified line, enforcing the write policy includes caching the modified data by overwriting the modified line. In at least one embodiment, when the write instruction hits to a set and way storing a clean line and the number of ways storing modified data in the set is equal to W, enforcing the write policy includes selecting, from the set, a way containing a modified line, writing back the modified line in the selected way to a system memory, caching the modified data in the selected way, and invalidating the clean line. In at least one embodiment, when a write instruction misses in the cache, enforcing the write policy may include determining from cache line status bits, including modified line status bits, a number of modified lines in the set associated with the write address. When the number of modified lines in the set is less than the value W, in at least one embodiment, a way not containing a modified line may be selected, and the modified data cached in the selected way. When the number of modified lines in the set is not less than the value W, some embodiments may include caching the modified data by overwriting a selected one of the ways containing a modified line, with the modified data. When a read instruction misses in the cache, in at least one embodiment, enforcing the read policy may include determining from cache lines status bits, including clean line status bits indicating clean lines, a number of clean lines in the set. When the number of clean lines in the set is equal to the value R, in at least one embodiment, enforcing the read policy may include selecting a replacement line from the clean lines in the set, retrieving read data corresponding to the read address from a system memory, and storing the read data in the replacement line.

In some embodiments, enforcing a prefetch policy for the set includes restricting a number of ways in the set storing prefetch read data to a maximum value $R_P$ and/or restricting a number of ways in the set storing prefetch modified data to a maximum value $W_P$. In at least one embodiment, cache status bits for cache lines in the set may include prefetch status bits indicating whether a cache line stores prefetch data. The method may further include calculating cache miss rates for different values of $R_P$ and $W_P$, and identifying values for $R_P$ and $W_P$ based on the cache miss rates.

In at least one embodiment, a processor determines a value W indicating a maximum number of ways available to modified data in an N-way set associative data cache. The processor may detect modified data and a write address associated with a write instruction in at least one embodiment. When caching the modified data in a set associated with the write address, some embodiments of the processor may enforce a write policy that restricts a number of ways storing modified data in the set to the maximum number W, and enforce a prefetch policy for the set. In at least one embodiment, the prefetch policy may include a policy selected to restrict a number of ways in the set storing prefetch read data to a maximum value $R_P$ and/or restrict a number of ways in the set storing prefetch modified data to a maximum value $W_P$. In at least one embodiment, cache status bits for cache lines in the set may include prefetch status bits indicating whether a cache line stores prefetch data.

In at least one embodiment, a disclosed system includes a processor including an N-way set associative cache. In some embodiments, the processor may determine a value W indicating a maximum number of ways available to modified data in the N-way set associative data cache, detect modified data and a write address associated with a write instruction, and detect a read address associated with a read instruction. When caching modified data in a set associated with the write address, embodiments of the processor may enforce a write policy that restricts a number of ways storing modified data in the set to the maximum number W. When accessing a set associated with the read address to retrieve read data from the set, at least one embodiment of the processor may enforce a read policy that restricts a number of ways storing read data in the set to a maximum number R, wherein the sum of R and W is N.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Embodiments may be implemented in many different system types and platforms. FIG. 1 illustrates a point-to-point computer system that may be used in conjunction with at least one embodiment. In at least one embodiment, system 100 is a multi-processor system that include a first processor 170-1 and a second processor 170-2. While in some embodiments, two processors 170 are included, other embodiments may include more or fewer processors. In at least one embodiment, processors 170 includes a core region 178 and an integration region 180. In some embodiments, core region 178 includes one or more processing cores 174 while integration region 180 includes a memory controller hub (MCH) 172, a processor-hub point-to-point interface 176, and a processor-processor point-to-point interface 175.

In at least one embodiment, processing cores 174 may each include hardware and firmware resources (not depicted) to support an execution pipeline. These resources may include, in some embodiments, a cache memory hierarchy, which may include a dedicated level one (L1) instruction cache, a dedicated L1 data cache, a level 2 (L2) data/instruction cache, or a combination thereof, prefetch logic and buffers, branch prediction logic, decode logic, a register file, various parallel execution resources including arithmetic logic units, floating point units, load/store units, address generation units, a data cache, and so forth.

In some embodiments, MCH 172 supports bidirectional transfer of data between a processor 170 and a system memory 132 via a memory interconnect 182. In at least one embodiment, system memory 132 may be a double-data rate (DDR) type dynamic random-access memory (DRAM) while memory interconnect 182 and MCH 172 may comply with a DDR interface specification. In at least one embodiment, system memory 132-1 may represent a bank of memory interfaces (or slots) that may be populated with corresponding memory circuits for a desired DRAM capacity.

In at least one embodiment, each processor 170 includes an MCH 172 to communicate with a portion of system memory 132 that is local to processor 170. In at least one embodiment, system memory 132-1 is local to processor 170-1 and represents a portion of the system memory 132 as a whole. In some embodiments, system 100 is a distributed memory multiprocessor system in which each processor 170 can access each portion of system memory 132, whether local or not. In some embodiments, while local accesses may have lower latency, accesses to non-local portions of system memory 132 are permitted.

In some embodiments, each processor 170 also includes a point-to-point interface 175 that supports communication of information with a point-to-point interface 175 of one of the other processors 170 via an inter-processor point-to-point interconnection 151. In some embodiments, processor-hub point-to-point interconnections 152 and processor-processor point-to-point interconnections 151 are distinct instances of a common set of interconnections. In other embodiments, point-to-point interconnections 152 may differ from point-to-point interconnections 151.

In at least one embodiment, processors 170 include point-to-point interfaces 176 to communicate via point-to-point interconnections 152 with a point-to-point interface 194 of an I/O hub 190. In some embodiments, I/O hub 190 includes a graphics interface 192 to support bidirectional communication of data with a graphics adapter 138 via a graphics interconnection 116, which may be implemented as a high speed serial bus, e.g., a peripheral component interconnect express (PCIe) bus or another suitable bus.

In some embodiments, I/O hub 190 also communicates, via an interface 196 and a corresponding interconnection 156, with a bus bridge hub 118 that supports various bus protocols for different types of I/O devices or peripheral devices. In at least one embodiment, bus bridge hub 118 supports a network interface controller (NIC) 130 that implements a packet-switched network communication protocol (e.g., Gigabit Ethernet), a sound card or audio adapter 132, and a low bandwidth bus 122 (e.g., low pin count (LPC), I2C, Industry Standard Architecture (ISA)), to support legacy interfaces referred to herein as desktop I/O devices 124 that might include interfaces for a keyboard, mouse, serial port, parallel port, and a removable media drive. In at least one embodiment, low bandwidth bus 122 further includes an interface for a nonvolatile memory (NVM) device such as flash read only memory (ROM) 126, and other low bandwidth desktop I/O devices 124 (e.g., keyboard mouse, or other I/O device). In some embodiments, a storage protocol bus 121 (e.g., serial AT attachment (SATA), small computer system interface (SCSI)) supports persistent storage devices including conventional magnetic core hard disk drives (HDD) 128. In at least one embodiment, HDD 128 includes store code 129, which may represent processor executable instructions including operating system instructions, application program instructions, and so forth, that, when executed by the processor, cause the processor to perform operations described herein.

In at least one embodiment, system 100 also includes an "HDD-like" semiconductor-based storage resource referred to as solid state drive 140, and a general purpose serial communication bus 120 (e.g., USB, PCI, PCIe) to support various I/O devices 112. Although specific instances of communication busses and bus targets have been illustrated and described, other embodiments may employ different communication busses and different target devices.

Figure 2A:
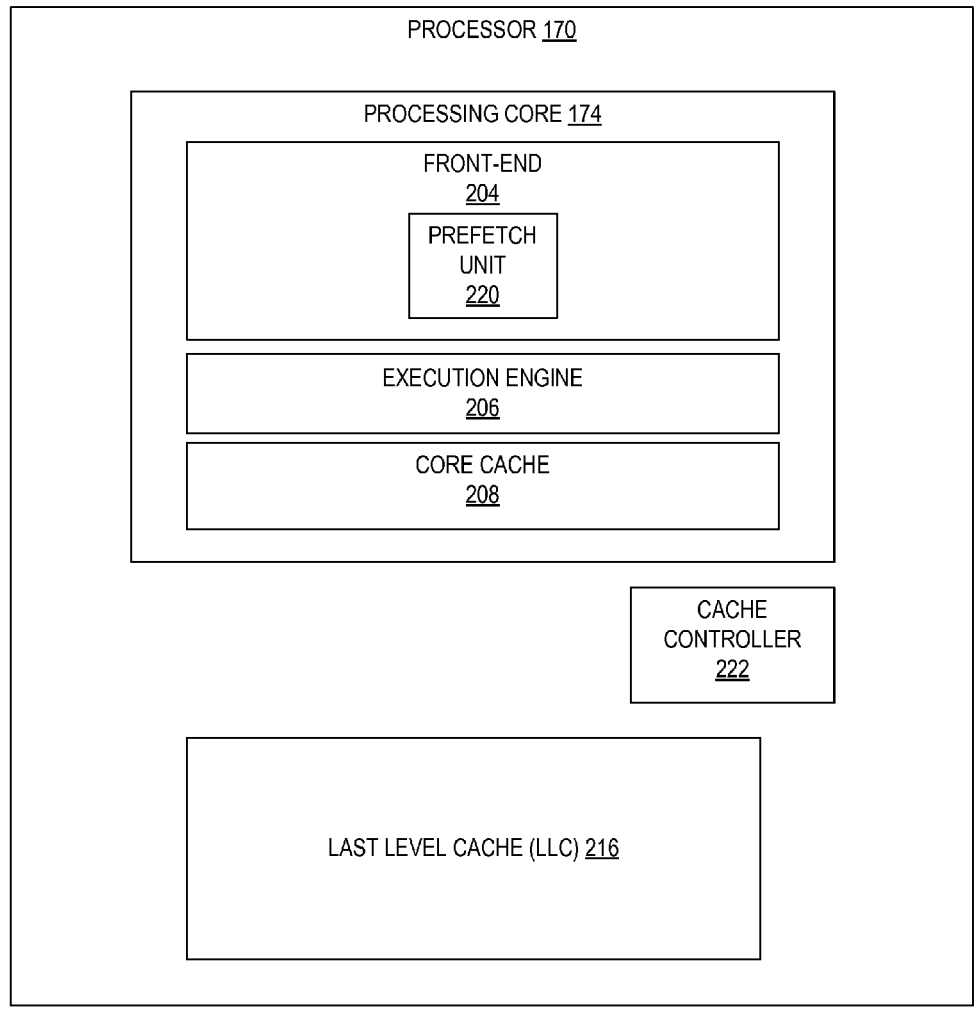
FIG. 2A illustrates a processor used in conjunction with at least one embodiment.

FIG. 2A illustrates a processor used in conjunction with at least one embodiment. In at least one embodiment, processor 170 includes a processing core 174. Although a single processing core 174 may be included in some embodiments, other embodiments may include a different number of processing cores 174. In at least one embodiment, processing core 174 includes a number of sub-elements or clusters, that provide different aspects of overall functionality. Processing core 174 includes, in some embodiments, a front-end 204, an execution engine 206, and a core cache 208.

In at least one embodiment, front-end 204 may be responsible for fetching instruction bytes and decoding those instruction bytes into micro-operations for execution engine 206. Thus, in some embodiments, front-end 204 may be responsible for ensuring that a steady stream of instructions are fed to execution engine 206. In some embodiments, front-end 204 includes prefetch unit 220, which may employ a novel constraint on read and modified data stored therein. In at least one embodiment, execution engine 206 may be responsible for scheduling and executing instructions and may include buffers for reordering instructions and a number of execution ports (not shown in FIG. 2A). In some embodiments, core cache 208 may include multiple levels of a cache hierarchy. Specifically, in some embodiments, core cache 208 may include a first level or L1 cache (not shown). In at least one embodiment, core cache 208 may further include a mid-level or L2 cache (not shown). Moreover, each cache may be a data only cache, an instruction cache, or a cache that includes both.

In some embodiments, processor 170 includes a shared cache, referred to herein as last level cache (LLC) 216, which may be a higher-level cache that operates in conjunction with core cache 208 and may be shared by multiple processing cores 174. Thus, in some embodiments, LLC 216, along with core cache 208, may represent a part of a cache hierarchy. In some embodiments, during operation, memory access instructions from execution engine 206 may first access core cache 208 before looking up any other caches within a system. Accordingly, in some embodiments, for improved performance, frequently accessed data is ideally present in the lowest possible cache level, i.e., core cache 208. In at least one embodiment, when the requested data is not present in core cache 208, the processor may index or otherwise check LLC 216 for the data. As will be described in further detail, either LLC 216 or core cache 208 may, in some embodiments, be used, in conjunction with cache controller 222, for read/write cache partitioning.

Figure 2B:
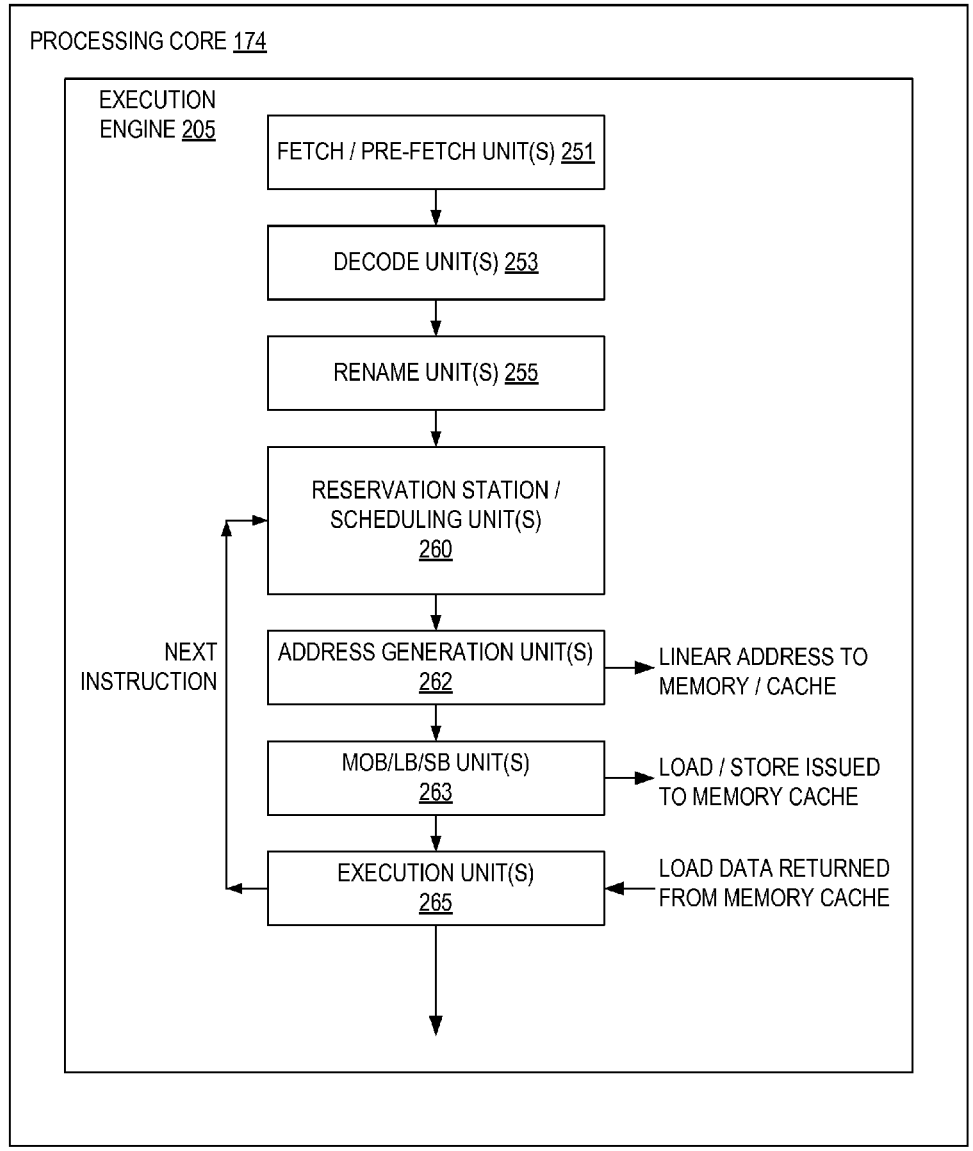
FIG. 2B illustrates a processor used in conjunction with at least one embodiment.

FIG. 2B illustrates an out-of-order execution core. In one embodiment, execution core 205 includes all or some of the elements of front end 204 and execution engine 206 of processing core 274. In at least one embodiment, pending loads may be speculatively issued to a memory address before other older pending store operations according to a prediction algorithm, such as a hashing function. In at least one embodiment, execution core 205 includes a fetch/prefetch unit 251, a decoder unit 253, one or more rename units 255 to assign registers to appropriate instructions or micro-ops, and one or more scheduling/reservation station units 260 to store micro-ops corresponding to load and store operations (e.g., STA micro-ops) until their corresponding target addresses source operands are determined. In some embodiments an address generation unit 262 to generate the target linear addresses corresponding to the load and stores, and an execution unit 265 to generate a pointer to the next operation to be dispatched from the scheduler/reservation stations 260 based on load data returned by dispatching load operations to memory/cache are also included. In at least one embodiment, a memory order buffer (MOB) 263, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores. In other embodiments, processor 270 is an in-order processor.

Figure 3:
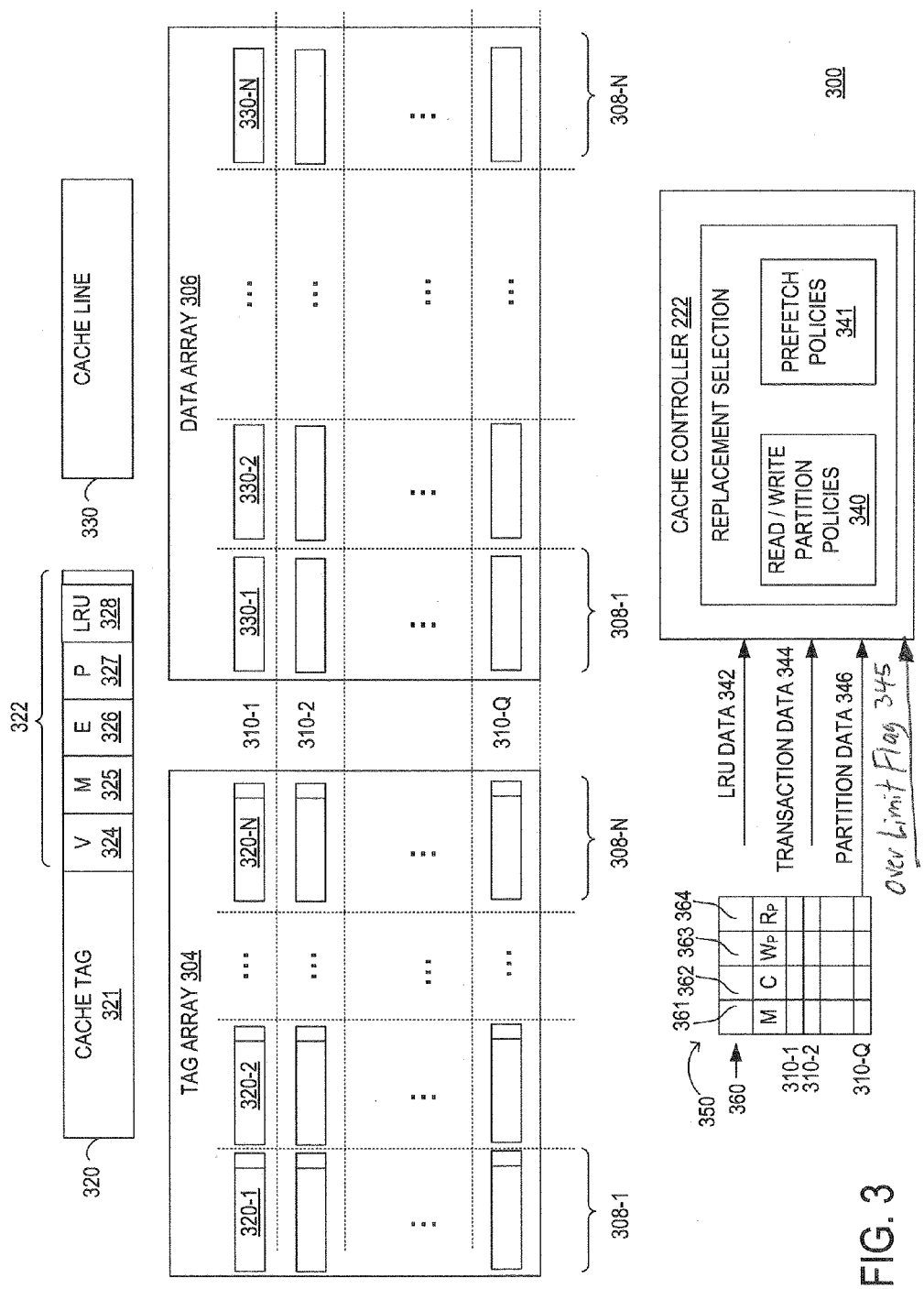
FIG. 3 illustrates a cache memory used in conjunction with at least one embodiment.

FIG. 3 illustrates a cache memory used in conjunction with at least one embodiment that may be used to implement read/write cache partitioning in a processor. In at least one embodiment, cache memory 300 may represent any of the different levels of caches, such as LLC 216, that may be included in the processor. Although cache memory 300 may be used for instructions and/or data, in some embodiments, cache memory 300 is (as shown) a data cache storing data associated with processor instructions, such as operands or results.

In general, data is transferred between system memory and cache memory in fixed-size blocks of data, i.e., cache lines. A cache memory may include a desired number of cache lines as well as additional information associated with each cache line, including a cache tag and one or more status bits. A cache tag may hold information such as a portion of the system memory location (address) that the cache line corresponds to and status bits that indicate parameters associated with the cache line.

In at least one embodiment, cache memory 300 includes a data array 306 and a tag array 304, each of which is arranged with N columns or ways 308-1 through 308-N and Q rows or sets 310-1 through 310-Q. In some embodiments, each entry 320 in tag array 304 includes a cache tag 321 and a status portion 322. In some embodiments, each entry 330 in data array 306 represents a contiguous portion of system memory.

In at least one embodiment, status portion 322 includes a valid bit 324, a modified bit 325, an exclusive bit 326, a prefetch bit 327, and a last recently used (LRU) field 328. The bits and fields in status portion 322 may, in some embodiments, be used to determine a coherency state of the corresponding cache line according to a defined coherency state protocol such as the MESI protocol. The MESI protocol identifies four distinct states of a cache line, which are presented in Table 1 below. It is noted that in different embodiments, various other protocols and status bit definitions may be implemented. In some embodiments, the state protocol may be implemented at least in part by a cache controller.

TABLE 1

Description of Cache Line States in the MESI Protocol

| MESI State | Description |
|---|---|
| MODIFIED | The cache line was modified from an original value previously retrieved from system memory, also referred to as a 'dirty' line. |
| EXCLUSIVE | The cache line is a valid copy of the corresponding system memory location, also referred to as a 'clean' line, and is unique among cached lines. |
| SHARED | Also a clean line but one that is not unique among cache lines. |
| INVALID | The cache line has not been allocated. |

In addition to adherence to a coherency state protocol, a cache memory is further characterized by its associativity. A fully associative cache refers to a cache memory in which any memory address can be stored in any of the cache entries. A direct mapped cache, on the other hand, maps a memory address to one and only one entry in the cache. A set associative cache is intermediate between the direct mapped cache and the fully associative cache. In a set associative cache, a system memory address maps to a set in the cache memory based upon a subset of the system memory address. In addition, the set may include two or more ways, any of which may be associated with the system memory address. In an N-way, set associative cache, a system memory address maps to a particular set, but can be associated with any of the N ways in the set.

In at least one embodiment, cache memory 300 is an N-way set associative cache, where the sets 310 are shown in rows and the ways 308 are shown in columns. In some embodiments, cache memory 300 includes cache tag array 304 and corresponding cache data array 306, which each contain sets (or rows) having N-number of ways (or columns), and whose entries correspond directly to each other. In other words, in some embodiments, for each cache data line 330 in cache data array 306, a corresponding cache tag entry 320 in cache tag array 304 stores tag information, such as memory location and status bits. Accordingly, in some embodiments, set 1 310 is a first set in cache memory 300 and includes cache tag entries 320-1, 320-2, up to 320-N that respectively correspond to cache data lines 330-1, 330-2, up to 330-N. In at least one embodiment, additional rows in cache tag array 304 and cache data array 306 represent further sets 310 in cache memory 300.

In some embodiments, cache controller 222 may implement read/write partition policies 340 and prefetch policies 341. In at least one embodiment, cache controller 222 receives, accesses, or otherwise obtains information including LRU data 342, transaction data 344, an over limit flag 345, and partition data 346. In some embodiments, partition data 346 parameters may include partition limits 360 that include a write partition limit (M) 361, a read partition limit (C) 362, a prefetch write limit ($W_P$) 363, and prefetch read limit ($R_P$) 364.

In addition, in some embodiments, partition data 346 that cache controller 222 uses to make a replacement selection may include information stored in a data structure referred to herein as partition scoreboard 350. In at least one embodiment, partition scoreboard 350 includes a row for each set 310 in cache memory 300 and a set of four columns including a column indicating the number of modified entries, a column indicating the number of clean entries, a column indicating the number of prefetch write entries, and a column indicating the number of prefetch read entries. In some embodiments, cache controller 222 may maintain scoreboard 350 by updating its contents each time a line is allocated, modified, or invalidated.

In at least one embodiment, cache controller 222 may implement read/write partition policy 340 based upon information in scoreboard 350 as well as LRU data 342 and transaction data 344 indicating the type of transaction being processed, e.g., load or store. If a policy limiting the number of entries available to store modified data is being enforced by cache controller 222, cache controller 222 may, in at least one embodiment, select a replacement entry in cache memory 300 upon receiving transaction data 344 indicating a write transaction when the information in scoreboard 350, coupled with the system memory address information indicating the set 310 associated with the memory address, to determine how to allocate entries in cache memory 300 in response to a write miss. If a write miss occurs and replacement cache controller 222 determines from scoreboard 350 that the cache miss corresponds to a set 310 in which the number of modified entries is not less than the limit for modified entries (M 361), i.e., the set 310 is full with respect to modified entries and the policy being enforced, cache controller 222 may, in at least one embodiment, allocate an entry in a way that does not increase the total number of modified entries in the applicable set 310 of cache memory 300, e.g., caching the write data in an entry that already contains modified data, after writing back the existing modified data to memory or a higher level of cache. Alternatively, the cache controller might, in some embodiments, permit an over limit condition by allocating the write miss to an entry that does not contain modified data, thereby increasing the number of entries containing modified data to W+1 or more. In one embodiment, cache controller 222 may set an over limit flag 345 when the number of modified entries exceeds the applicable limit to invoke a policy to restore the set to the preferred limit at the next opportunity. When the over limit flag 345 is set, cache controller 222 may, in at least one embodiment, process the next available read miss that maps to the set that is in the over limit condition to evict a modified entry, thus allocating an entry for the read miss. The LRU data 342 may, in at least one embodiment, be used to determine which entry within a given partition is best selected. Ideally, LRU data 342 includes sufficient information to enable a determination of which entry within a given partition is least recently used.

Moreover, in some embodiments, if prefetching is enabled and cache memory 300 is caching prefetched data, prefetched data associated with reads and writes may be indicated within scoreboard 350 and may be individually identified by valid bit 324, so that cache controller 222 may implement an allocation policy for prefetched data. If a prefetched write limit ($W_P$ 363) is equal to 1, and a cache line associated with a memory address already has one entry allocated for a write prefetch, any subsequent write pre-fetch to the applicable set 310 may, in at least one embodiment, result in allocating the way 308 that already contains the prefetched data so that the number of entries containing prefetched data remains at 1.

In this manner, cache controller 222 may, in some embodiments, control a replacement policy for cache memory 300 consistent with the recognition of partitions for modified data and clean data. As indicated previously, cache controller 222 may, in some embodiments, implement a write policy that limits a number of ways in any given set available to stored modified data to a number W. In at least one embodiment, cache controller 222 may also implement a read policy that restricts a number of ways storing read data in the set to a maximum number, R, as well as a prefetch policy restricting a number of ways in the set storing prefetch read data to a maximum value $R_P$ and/or restricting a number of ways in the set storing prefetch modified data to a maximum value $W_P$. In some embodiments, cache controller 222 may determine the values R, W, $R_P$, and/or $W_P$ by sampling sets in the cache and estimating cache miss rates for different possible values of R, W, $R_P$, and/or $W_P$. The values for R, W, $R_P$, and/or $W_P$ having an optimum value for a cache miss rate may be selected in some embodiments. In this manner, the read-write partitioning may, in some embodiments, be selectively applied or removed, depending on characteristics of applications executing on the processor.

In at least one embodiment, status portion 322 includes a valid bit 324, a modified bit 325, an exclusive bit 326, a prefetch bit 327, and least recently used field 328. A coherency state of the applicable cache line may, in some embodiments, be determined from the status portion 322 and may further include prefetch status bits indicating whether a cache line stores prefetch data. The status bits may be read and/or written by the cache controller in some embodiments.

Figure 4:
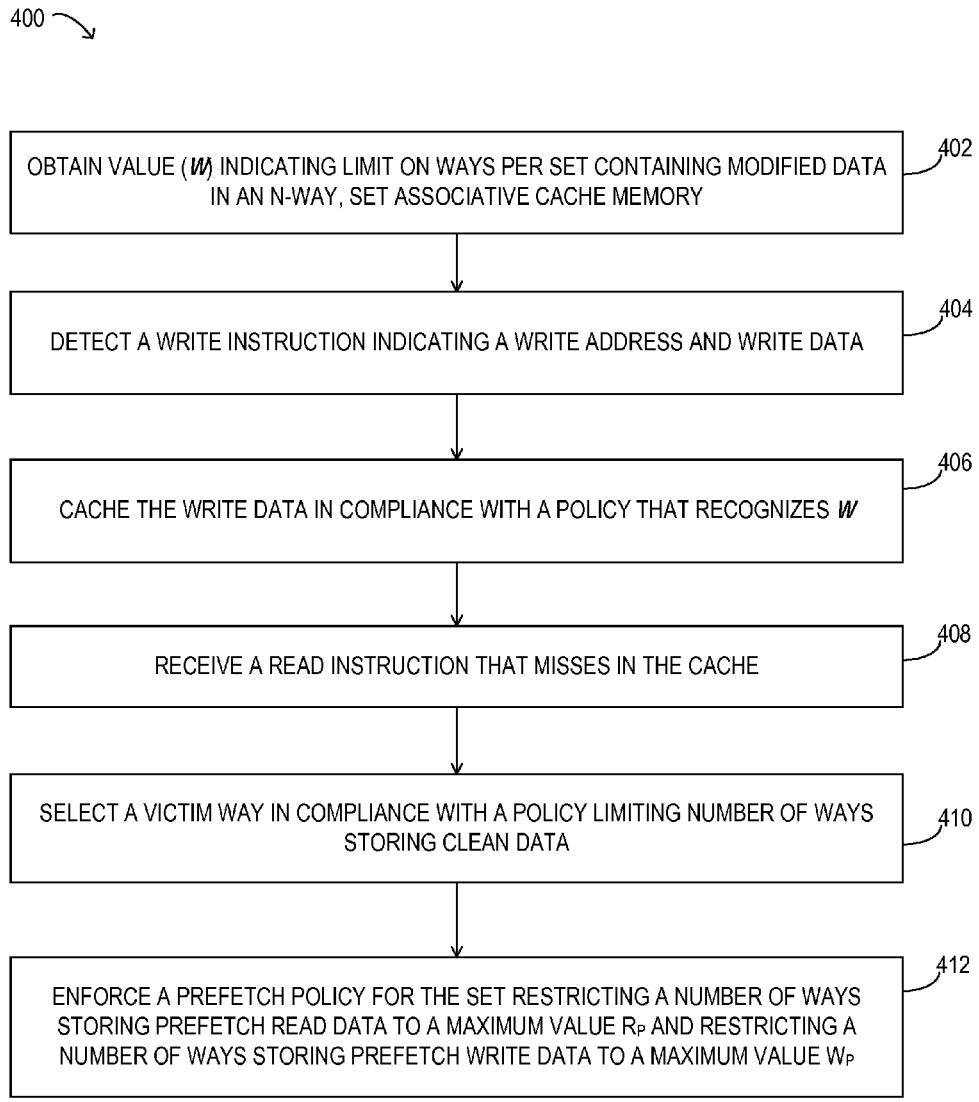
FIG. 4 illustrates one embodiment of a method for read-write partitioning of cache memory.

FIG. 4 illustrates one embodiment of a method for read-write partitioning of cache memory. It is noted that operations in method 400 may be omitted or rearranged in different embodiments, as desired. In at least one embodiment, method 400 may be executed, at least in part, by processor 170 (see FIG. 1). In given embodiments, at least a portion of method 400 is performed by cache controller 222.

In at least one embodiment, method 400 includes obtaining (operation 402) a value W indicating a maximum number of ways per set that contain modified data in an N-way, set associative cache memory. In some embodiments, method 400 further includes detecting (operation 404) a write instruction indicating a write address and containing write data. The write data is, in some embodiments, cached (operation 406) in compliance with a policy that recognizes W, the maximum number of ways that can contain modified data.

In some embodiments, if the write instruction hits to an entry in the cache memory, the method 400 may simply overwrite the existing entry if the existing entry contains modified data. If the write instruction hits to an entry that contains clean data, the write data may, in some embodiments, overwrite the clean data if the write partition is not full, i.e., the number of ways containing modified data is less than W. If the write instruction hits to a clean entry and the write partition is full, one embodiment may select a way in the write partition as a victim way, write back modified data stored in the victim way to memory or to a higher level cache memory, cache the write data in the victim way, and invalidate the entry that contained the clean data. In other embodiments, a write instruction that hits to a clean entry when the write partition is full is handled by caching the write data in the entry containing the clean data, selecting a victim way in the write partition to evict, and evicting the victim way selected, where eviction includes first writing back the modified data in the victim way to memory or a higher cache level and then invalidating the entry in the cache.

In at least one embodiment, if a write misses in the cache and the write partition is not full, the write data may be cached by first selecting a way not containing modified data (e.g., a clean or invalid entry) to include in the write partition. If the available ways include invalid ways as well as ways containing clean data, the method will, in some embodiments, preferentially select one of the invalid entries for caching the write data. In some embodiments, if there are no invalid entries to choose from, one of the ways containing clean data is selected, and the write data is cached in the selected way, which is updated to reflect it as a modified entry.

In some embodiments, if the write instruction misses in the cache memory and the write partition is full, the cache controller may identify any way from the write partition and write the modified data in the selected entry back to memory or a higher-level cache and overwrite the entry with the write data. Alternatively, in some embodiments, the write instruction may be cached by identifying a clean entry, storing the write data in the clean entry, and modifying the status associated with the entry to indicate the entry as an entry containing modified data. Since the write partition was full at the beginning of this process, the way would now contain W+1 entries with modified data. In some embodiments, W+1 modified entries is prohibited and the cache may respond by selecting one of the W+1 ways containing modified data, writing the modified data associated with the selected way back to memory or a different cache level, and invalidating the entry. Other embodiments may tolerate, at least for a limited duration, W+1 or more modified entries. In one of these embodiments, instead of initiating an immediate write back of one of the ways containing modified data, the cache controller may record the "over" condition and institute a replacement policy to encourage the cache to transition back to a state in which the set contains W modified ways. In at least one embodiment, the cache controller could set a flag to indicate an "over" policy that preferentially selects an entry with modified data as the victim line the next time a read instruction associated with the set misses. Under this policy, a subsequent read miss will, in some embodiments, replace a modified entry with a clean entry, thereby clearing the "over" condition. This permissive over policy could be limited to one instance per set, i.e., W+1 is the maximum number of modified entries, or, alternatively, the over policy could be permitted to remain in place wherein the maximum number of modified entries could exceed W by two or more. In some instances, a limit on how long the set could remain in an over condition could be imposed, in some embodiments, through the use of a clock cycle counter or the like. In these embodiments, a set in an over condition might be forcibly restored to a state in which the set contains W modified entries by mandating a write back of one or more modified entries.

In at least one embodiment, method 400 further includes receiving (operation 408) a read instruction associated with an address that misses in the cache memory. In some embodiments, when allocating an entry in the set associated with the read instruction address, the method selects a way to evict or replace in compliance with a policy recognizing a maximum number of ways storing clean data (operation 410). In some embodiments, this policy would be enforced in a manner analogous to the manner described above with respect to the write policy except that the read policy would not have to account for a read instruction that hits to a modified way in the same manner that a write instruction that hits to a clean entry would, i.e., read hits require no replacement.

In at least one embodiment, method 400 further includes enforcing (operation 412) a prefetch policy by monitoring prefetched data counts, i.e., the number of ways containing read prefetches, write prefetches, or both, and enforcing the policy through the selection of replacement lines when the applicable prefetch count(s) are reached. In these embodiments, prefetch counts may or may not contribute to the applicable partition counts, e.g., a write prefetch may or may not increment W the number of ways containing modified data. In one embodiment, the write and read partition counts are not influenced by the prefetch counts. In some embodiments that employ prefetch limits, operation 412 includes restricting a number of ways storing prefetched read data to a maximum value $R_P$ while also restricting a number of ways storing prefetched write data to a maximum value $W_P$.

Figure 5A:
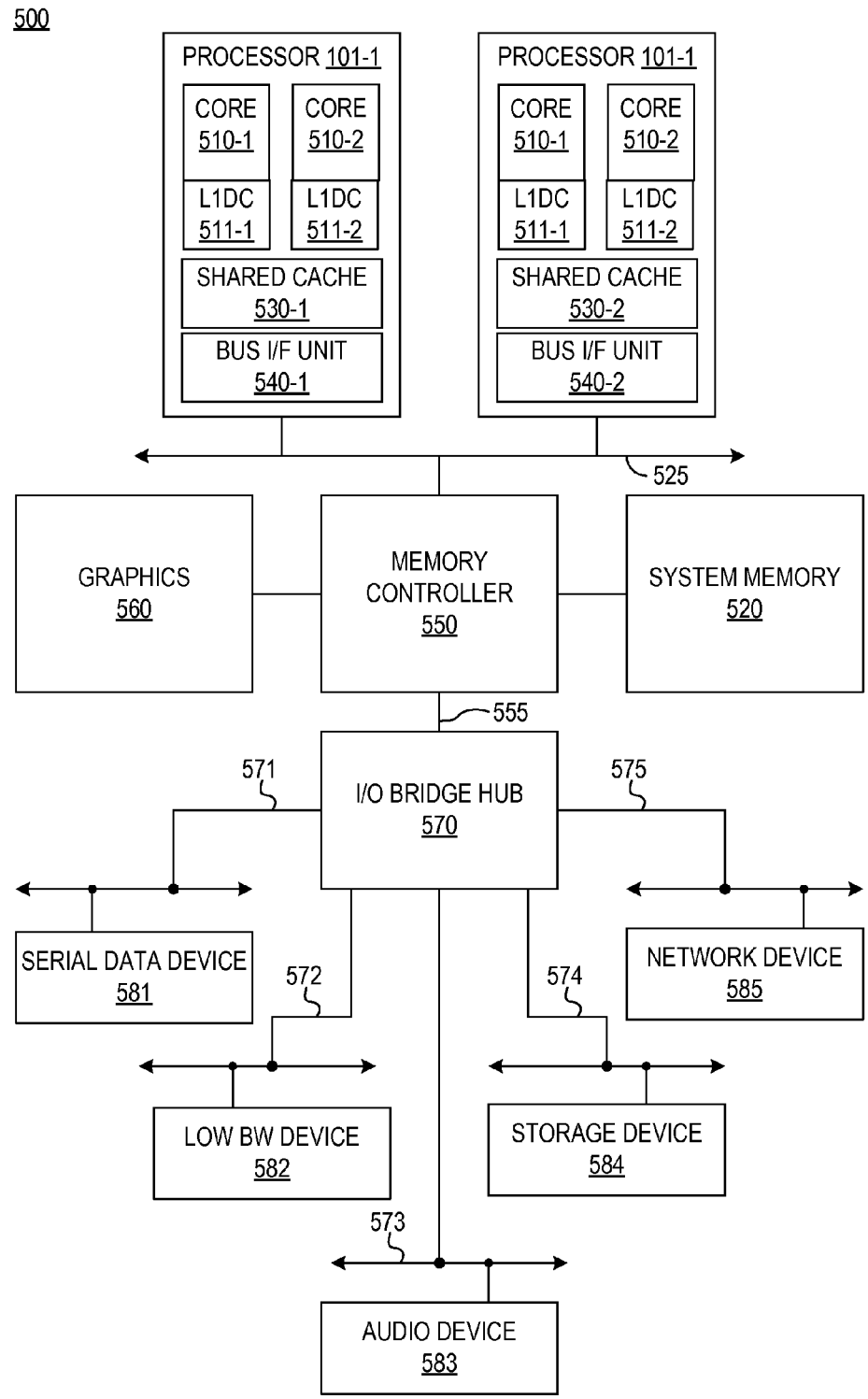
FIG. 5A and FIG. 5B illustrate a shared bus system that may be used in conjunction with at least one embodiment.

FIG. 5A illustrates a shared bus system that may be used in conjunction with at least one embodiment. In one embodiment, computer system 500 features a shared bus architecture, in which multiple processors 101 share access to system memory 520 through a common bus 525 through which both processors 101 and a memory controller 550 communicate. In some embodiments, the processors 101 include multiple processing cores 510, of which two processing cores 510-1 and 510-2, are shown. In some embodiments, each processing core 510 is in conjunction with a level one data cache 511. In at least one embodiment, each processing core 510 of processors 101 shares a cache 530 and communicates with bus 525 through a bus interface unit 540.

In at least one embodiment, a memory controller 550 communicates with graphics adapter 560 as well as system memory 520. In some embodiments, an I/O bridge hub 570 connects to memory controller 550 through an I/O interconnect 555. In some embodiments, I/O bridge hub 570 implements one or more bus protocols in a manner similar to the I/O bridge hub described with respect to FIG. 1. Thus, I/O bridge hub 570 may, in at least one embodiment, provide a USB 571 for connecting a serial data device 581, a low pin count or low bandwidth bus 572 for connecting a low bandwidth device 582, any data storage busses 574 for connecting a storage device 584, as well as an Ethernet bus 575 for connecting a network device 585 and a bus 573 for connecting an audio device 583.

Figure 5B:
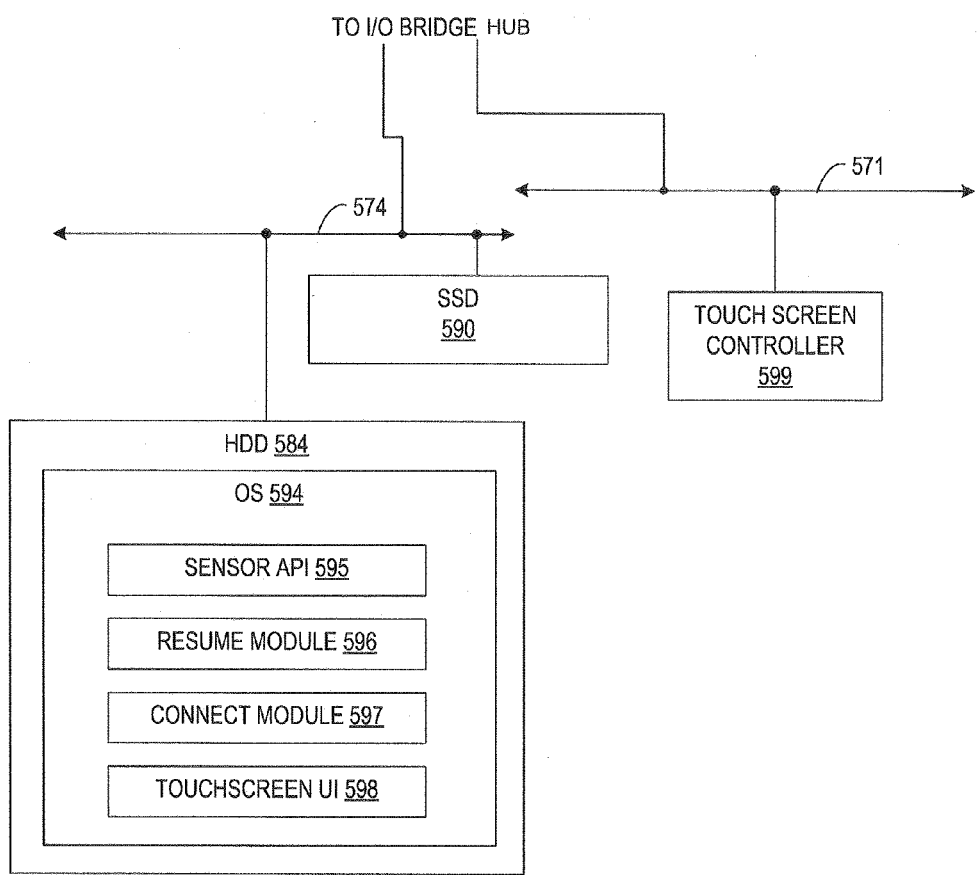

FIG. 5B illustrates a shared bus system that may be used in conjunction with at least one embodiment. In at least one embodiment, system 500 includes operating system 594 that may be entirely or partially stored in a storage device 584. Operating system 594 may include various modules, application programming interfaces, and the like that expose to varying degrees various hardware and software features of system 500. In at least one embodiment, system 500 includes a sensor application programming interface (API) 595, a resume module 596, a connect module 597, and a touchscreen user interface 598. In some embodiments, system 500 may further include various hardware/firmware features include a capacitive or resistive touch screen controller 599 and a second source of persistent storage such as a solid state storage 590.

In at least one embodiment, sensor API 595 provides application program access to one or more sensors (not depicted) that may be included in system 500. Sensors that system 500 might include, in at least one embodiment, are an accelerometer, a global positioning system (GPS) device, a gyrometer, an inclinometer, and/or a light sensor. In some embodiments, resume module 596 may be implemented as software that, when executed, performs operations for reducing latency when system 500 transitions from a power conservation state to an operating state. In at least one embodiment, resume module 596 may work in conjunction with solid state storage 590, which may represent a solid state drive (SSD), to reduce the amount of SSD storage required when system 500 enters a power conservation mode. Resume module 596 may, in at least one embodiment, flush standby and temporary memory pages before transitioning to a sleep mode. In some embodiments, by reducing the amount of system memory space that system 500 is required to preserve upon entering a low power state, resume module 596 beneficially reduces the amount of time required to perform the transition from the low power state to an operating state. In some embodiments, connect module 597 may include software instructions that, when executed, perform complementary functions for conserving power while reducing the amount of latency or delay associated with traditional "wake up" sequences. Connect module 597 may, in at least one embodiment, periodically update certain "dynamic" applications including email and social network applications, so that, when system 500 wakes from a low power mode, the applications that may likely require refreshing are up to date. In at least one embodiment, touchscreen user interface 598 supports a touchscreen controller 599 that enables user input via touchscreens traditionally reserved for handheld applications. In some embodiments, the inclusion of touchscreen support in conjunction with support for desktop devices 124 (see FIG. 1), such as a keyboard and/or a mouse, may enable system 500 to provide features traditionally found in dedicated tablet devices as well as features found in dedicated laptop and desktop type systems.

Figure 6:
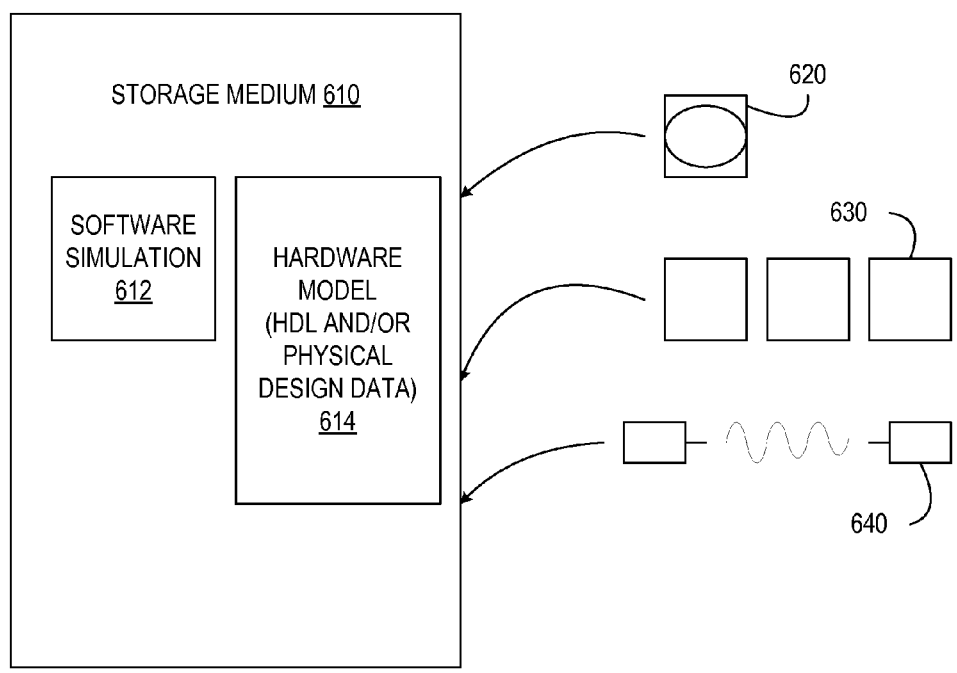
FIG. 6 is a block diagram of selected elements of a representation for simulation, emulation and fabrication of a design for a processor.

FIG. 6 is a block diagram of selected elements of a representation for simulation, emulation and fabrication of a design for a processor. Data representing a design may represent the design in a number of manners. First, as is useful in simulations, the hardware may be represented using a hardware description language or another functional description language which basically provides a computerized model of how the designed hardware is expected to perform. In at least one embodiment, the hardware model 614 may be stored in a storage medium 610 such as a computer memory so that the model may be simulated using simulation software 612 that applies a particular test suite to the hardware model 614 to determine if it indeed functions as intended. In some embodiments, the simulation software 612 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 640 modulated or otherwise generated to transmit such information, a memory 630, or a magnetic or optical storage 620 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

Embodiments may be implemented in processor-executable instructions or code and stored on a storage medium. When a processor executes the instructions or code, the instructions may cause the processor to perform a method or a set of operations. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), or magnetic or optical cards.

The following pertain to further embodiments.

Embodiment 1 is a method for partitioning cache memory comprising: (i) obtaining a value W indicating a maximum number of ways containing modified data in an N-way, set associative data cache; (ii) detecting a write address of a write instruction that misses in the data cache; and (iii) allocating, in compliance with a write policy recognizing W, a way of a set associated with the write address to cache write data included in the write instruction.

In embodiment 2, the subject matter of embodiment 1 can optionally include (i) detecting a read address of a read instruction that misses in the data cache; and (ii) allocating, in compliance with the write policy recognizing W, a way of a set associated with the read address to cache read data associated with the read instruction.

In embodiment 3, the obtaining of the value W included in the subject matter of embodiment 1 can optionally include calculating cache miss rates for different values of W and determining the value W based on the cache miss rates.

In embodiment 4, the write policy included in the subject matter of embodiment 1 can optionally provide when the write instruction hits to an entry at a set and way containing unmodified data and the set includes at least W ways containing modified data: (i) caching the write data in the entry; (ii) indicating the way as containing modified data; and (iii) setting a flag to preferentially allocate a way containing modified data when next allocating an entry for clean data.

In embodiment 5, the enforcing of the write policy in the subject matter of embodiment 1 can optionally include: when the write instruction hits to an entry at a set and way containing unmodified data and the set includes at least W ways containing modified data: (i) identifying, in the set, a first way containing modified data; (ii) writing back the modified data in the first way; (iii) caching the write data in the first way; and (iv) invalidating the entry.

In embodiment 6, the subject matter of embodiment 1 can optionally include: (i) detecting a read address associated with a read instruction that misses in the data cache; and (ii) allocating, in compliance with a read policy recognizing a value R, a way in the set for caching read data associated with the read instruction, wherein the value R indicates a maximum number of ways per set containing unmodified data.

In embodiment 7, the allocating of the way in the subject matter of embodiment 6 can optionally include: (i) determining from cache line status bits, including clean line status bits indicating clean lines, a number of ways in the set containing unmodified data; and (ii) when the number of ways in the set is not less than the value R: selecting a victim way from the ways containing unmodified data; and caching the read data in the victim way.

In embodiment 8, the enforcing of the write policy in the subject matter of embodiment 1 can optionally include: when the write instruction misses in the cache, determining from cache line status bits, including modified line status bits, a number of ways, in the set associated with the write address, containing modified data.

In embodiment 9, the subject matter of embodiment 8 can optionally include when the number of ways is less than the value W, selecting a first way in the set not containing modified data; and caching the write data in the first way.

In embodiment 10, the subject matter of embodiment 8 can optionally include when the number of ways is not less than the value W: (i) selecting a victim way, in the set, containing modified data; (ii) writing back modified data in the victim way; and (iii) caching the write data in the victim way.

In embodiment 11, the subject matter of embodiment 1 can optionally include maintaining prefetch status bits indicating whether respective entries in the data cache store prefetched data; and allocating entries in the data cache in compliance with a prefetch policy selected from: (i) limiting a number of ways per set available to store prefetched read data to a maximum value $R_P$; and (ii) limiting a number of ways per set available to stored prefetched modified data to a maximum value $W_P$.

In embodiment 12, the subject matter of embodiment 11 can optionally include calculating cache miss rates for different values of $R_P$ and $W_P$; and identifying values for $R_P$ and $W_P$ based on the cache miss rates.

Embodiment 13 is a processor comprising: a processing core; an N-way, set associative cache memory accessible to the processing core; and a cache memory controller to: (i) recognize first partitions comprising M ways of each set of the cache memory; (ii) allocate a way, from the first partition of a set associated with an instruction of a first type that misses in the cache, to store first data associated with the first instruction; (iii) detect modified data and a write address associated with a write instruction; (iv) when caching the modified data in a set associated with the write address, enforce a write policy that restricts a number of ways storing modified data in the set to the maximum number W; and (v) enforce a prefetch policy for the set, the prefetch policy including a policy to: restrict a number of ways in the set storing prefetch read data to a maximum value $R_P$; and restrict a number of ways in the set storing prefetch modified data to a maximum value $W_P$, wherein cache status bits for cache lines in the set include prefetch status bits indicating whether a cache line stores prefetch data.

In embodiment 14, the cache memory controller included in the subject matter of embodiment 13 is optionally operable to: calculate cache miss rates for different values of N; and determine the value N based on the cache miss rates.

In embodiment 15, the cache memory controller included in the subject matter of embodiment 13 is optionally operable to: determine a number of ways in a set containing prefetched data; and allocate cache memory entries for prefetched data in compliance with a prefetch threshold indicating a maximum number of ways per set containing prefetched data.

In embodiment 16, the cache memory controller included in the subject matter of embodiment 15 is optionally operable to: calculate cache miss rates for different values of the prefetch threshold; and select a value for $R_P$ and $W_P$ based on the cache miss rates.

In embodiment 17, the first partition included in the subject matter of embodiment 13 optionally includes a write partition and the instruction of the first type comprises a write instruction.

In embodiment 18, the first partition included in the subject matter of embodiment 13 optionally includes a read partition and the instruction of the first type included in the subject matter of embodiment 13 optionally includes a read instruction.

In embodiment 19, the cache memory controller included in the subject matter of embodiment 13 is optionally operable to: (i) recognize a second partition comprising L ways of each set of the cache memory; and (ii) allocate a way, from the second partition of a set associated with an instruction of a second type that misses in the cache, to store second data associated with the second instruction; wherein the instruction of the first type comprises a write instruction, the first data comprises write data, the instruction of the second type comprises a read instruction, and the second data comprises read data.

In embodiment 20, the first partition included in the subject matter of embodiment 13 optionally includes a write partition and the instruction of the first type included in the subject matter of embodiment 13 optionally includes a write instruction including write data and wherein the cache memory controller is operable to: (i) cache the write data by overwriting modified data when the write instruction hits to a set and way containing modified data; and (ii) when the write instruction hits to a set and way storing unmodified data and a number of ways storing modified data in the set is not less than M: select, from the write partition, a victim way including modified data; write back the modified data of the victim way; cache the write data in the victim way; and invalidate the set and way storing the unmodified data.

Embodiment 21 is a computer system comprising: first storage to store an operating system; and a processor including: a processing core; an N-way, set associative cache memory accessible to the processing core; and a cache controller to: (i) determine a value M indicating a maximum number of ways restricted to data of a first type in the N-way, set associative cache memory; (ii) detect a first address associated with a first instruction of a first type associated with first data; and (iii) when the first address misses in the cache memory, selecting, in a set associated with the first address, a victim way in compliance with a first policy limiting a number of ways storing first data in the set to the value M.

In embodiment 22, the processor included in the subject matter of embodiment 21 is optionally operable to: (i) enforce a first prefetch policy for the set restricting a number of ways in the set storing prefetch data of a first type to a first maximum; and (ii) enforce a second prefetch policy for the set restricting a number of ways in the set storing prefetch data of a second type to a second maximum.

In embodiment 23, the status bits for entries in the set included in the subject matter of embodiment 22 optionally include prefetch bits indicating whether a corresponding entry includes prefetched data.

In embodiment 24, the cache controller included in the subject matter of embodiment 23 is optionally operable to clear a prefetch bit of an entry that includes prefetched data in response to a demand access to the entry.

In embodiment 25, the enforcing of the write policy in the subject matter of any of embodiments 1-6 can optionally include: when the write instruction misses in the cache, determining from cache line status bits, including modified line status bits, a number of ways, in the set associated with the write address, containing modified data.

In embodiment 26, the subject matter of any of embodiments 1-6 can optionally include maintaining prefetch status bits indicating whether respective entries in the data cache store prefetched data; and allocating entries in the data cache in compliance with a prefetch policy selected from: (i) limiting a number of ways per set available to store prefetched read data to a maximum value $R_P$; and (ii) limiting a number of ways per set available to stored prefetched modified data to a maximum value $W_P$.

In embodiment 27, the cache memory controller included in the subject matter of any of embodiments 13, 14, or 15 is optionally operable to: calculate cache miss rates for different values of the prefetch threshold; and select a value for $R_P$ and $W_P$ based on the cache miss rates.

In embodiment 28, the status bits for entries in the set included in the subject matter of any of embodiments 21 or 22 optionally include prefetch bits indicating whether a corresponding entry includes prefetched data.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method comprising:
    obtaining a first maximum value indicating a maximum number of ways containing modified data in an multiple-way, set associative data cache;
    detecting a write address of a write instruction that misses in the data cache; and
    allocating, in compliance with a write policy recognizing the first maximum value, a way of a set associated with the write address to cache write data included in the write instruction, wherein when the set includes at least the first maximum value of ways containing modified data:
        permitting an over limit condition by allocating the way of the set that contains unmodified data and caching the write data in the way, the way containing the unmodified data, to increase a number of ways of the set containing modified data to more than the first maximum value;
        indicating the way as containing modified data;
        setting an over limit flag when the number of ways of the set containing modified data is greater than the first maximum value; and
        upon detecting a read address of a read instruction for read data that misses in the data cache, performing the following when the over limit flag is set:
            evicting modified data of a selected way of the set; and
            caching the read data of the read instruction in the selected way, to reduce the number of ways of the set containing modified data.

2. The method of claim 1, further comprising:
    detecting a read address of a read instruction that misses in the data cache; and
    allocating, in compliance with the write policy recognizing the first maximum value, a way of a set associated with the read address to cache read data associated with the read instruction.

3. The method of claim 1, wherein obtaining the first maximum value includes:
    calculating cache miss rates for different values of the first maximum value; and
    determining the first maximum value based on the cache miss rates.

4. The method of claim 1, wherein the write policy includes:
    when the set includes at least the first maximum value of ways containing modified data:
    identifying, in the set, a first way containing modified data;
    writing back the modified data in the first way; and
    caching the write data in the first way.

5. The method of claim 1, further comprising:
    detecting a read address associated with a read instruction that misses in the data cache; and
    allocating, in compliance with a read policy recognizing a value R, a way in the set for caching read data associated with the read instruction, wherein the value R indicates a maximum number of ways per set containing unmodified data.

6. The method of claim 5, wherein allocating the way includes:
    determining from cache line status bits, including clean line status bits indicating clean lines, a number of ways in the set containing unmodified data; and
    when the number of ways in the set is not less than the value R:
        selecting a victim way from the ways containing unmodified data; and
        caching the read data in the victim way.

7. The method of claim 1, wherein allocating the way includes:
    when the write instruction misses in the data cache, determining from cache line status bits, including modified line status bits, a number of ways, in the set associated with the write address, containing modified data.

8. The method of claim 7, further comprising:
    when the number of ways is less than the first maximum value, selecting a first way in the set not containing modified data; and
    caching the write data in the first way.

9. The method of claim 7, further comprising:
    when the number of ways is not less than the first maximum value:
        selecting a victim way, in the set, containing modified data;
        writing back modified data in the victim way; and
        caching the write data in the victim way.

10. The method of claim 1, further comprising:
    maintaining prefetch status bits indicating whether respective entries in the data cache store prefetched data; and allocating entries in the data cache in compliance with a prefetch policy selected from:
    limiting a number of ways per set available to store prefetched read data to a maximum value $R_P$; and
    limiting a number of ways per set available to stored prefetched modified data to a maximum value $W_P$.

11. The method of claim 10, further comprising:
calculating cache miss rates for different values of $R_P$ and $W_P$; and
identifying values for $R_P$ and $W_P$ based on the cache miss rates.

12. A computer system, comprising:
first storage to store an operating system; and
a processor including:
    a processing core;
    an N-way, set associative cache memory accessible to the processing core; and
    a cache controller to:
        determine a value M indicating a maximum number of ways restricted to data of a first type in the N-way, set associative cache memory;
        detect a first address associated with a first instruction of a first type associated with the data of the first type; and
        when the first address misses in the cache memory, select, in a set associated with the first address, a victim way in compliance with a first policy to limit a number of ways to store the data of the first type in the set to the value M, wherein the first policy is to enable at least M+1 ways to store the data of the first type, and responsive to storage of the at least one M+1 ways of the data of the first type, set an overlimit indicator to cause one of the M+1 ways to be a victim way when a second address associated with a second instruction of a second type associated with data of a second type misses in the cache memory, to enable the data of the second type to be stored in the victim way, to reduce the number of ways containing the data of the first type, wherein the data of the first type comprises modified data and the data of the second type comprises read data.

13. The system of claim 12, wherein the processor is operable to:
    perform a first prefetch policy for the set to restrict a number of ways in the set to store prefetch data of the first type to a first maximum; and
    perform a second prefetch policy for the set to restrict a number of ways in the set to store prefetch data of the second type to a second maximum.

14. The system of claim 13, wherein status bits for entries in the set include prefetch bits to indicate whether a corresponding entry includes prefetched data.

15. The system of claim 14, wherein the cache controller is operable to clear a prefetch bit of an entry that includes prefetched data in response to a demand access to the entry.

* * * * *